US012513478B2

(12) United States Patent
Nielsen et al.

(10) Patent No.: US 12,513,478 B2
(45) Date of Patent: Dec. 30, 2025

(54) METHOD OF OPERATING AN IN SITU FITTING SYSTEM AND AN IN SITU FITTING SYSTEM

(71) Applicant: Widex A/S, Lynge (DK)

(72) Inventors: Jens Brehm Bagger Nielsen, Ballerup (DK); Asger Ougaard, Frederikssund (DK); Lasse Lohilahti Moelgaard, Bagsvaerd (DK)

(73) Assignee: Widex A/S, Lynge (DK)

( * ) Notice: Subject to any disclaimer, the term of this patent is extended or adjusted under 35 U.S.C. 154(b) by 220 days.

(21) Appl. No.: 18/275,836

(22) PCT Filed: Feb. 4, 2021

(86) PCT No.: PCT/EP2021/052722
§ 371 (c)(1),
(2) Date: Aug. 4, 2023

(87) PCT Pub. No.: WO2022/167080
PCT Pub. Date: Aug. 11, 2022

(65) Prior Publication Data
US 2024/0305939 A1 Sep. 12, 2024

(51) Int. Cl.
*H04R 25/00* (2006.01)
*G06F 3/16* (2006.01)

(52) U.S. Cl.
CPC ............... *H04R 25/70* (2013.01); *G06F 3/16* (2013.01); *H04R 25/505* (2013.01); *H04R 25/558* (2013.01); *H04R 2225/41* (2013.01); *H04R 2225/55* (2013.01); *H04R 2460/07* (2013.01)

(58) Field of Classification Search
CPC .... H04R 25/70; H04R 25/505; H04R 25/558; H04R 2225/41
See application file for complete search history.

(56) References Cited

U.S. PATENT DOCUMENTS

| | | | | |
|---|---|---|---|---|
| 2012/0070023 A1* | 3/2012 | Nishizaki | H04R 25/70 | 381/314 |
| 2016/0174001 A1* | 6/2016 | Ungstrup | H04R 25/505 | 381/315 |
| 2018/0063653 A1* | 3/2018 | Aschoff | H04R 25/558 | |
| 2018/0213339 A1* | 7/2018 | Shah | H04R 25/558 | |

* cited by examiner

*Primary Examiner* — James K Mooney
(74) *Attorney, Agent, or Firm* — Sughrue Mion, PLLC

(57) ABSTRACT

A method (100) of operating an in situ fitting system adapted to provide improved user satisfaction with a hearing aid system and an in situ fitting system (200).

12 Claims, 2 Drawing Sheets

METHOD OF OPERATING AN IN SITU FITTING SYSTEM AND AN IN SITU FITTING SYSTEM

CROSS REFERENCE TO RELATED APPLICATIONS

This application is a National Stage of International Application No. PCT/EP2021/052722 filed Feb. 4, 2021.

The present invention relates to a method of operating an in situ fitting system. The invention also relates to an in situ fitting system.

BACKGROUND OF THE INVENTION

Within the context of the present disclosure a hearing aid can be understood as a small, battery-powered, microelectronic device designed to be worn behind or in the human ear by a hearing-impaired user. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit. A hearing aid comprises one or more microphones, a battery, a microelectronic circuit comprising a signal processor adapted to provide amplification in those parts of the audible frequency range where the user suffers a hearing deficit, and an acoustic output transducer. The signal processor is preferably a digital signal processor. The hearing aid is enclosed in a casing suitable for fitting behind or in a human ear.

Within the present context a hearing aid system may comprise a single hearing aid (a so called monaural hearing aid system) or comprise two hearing aids, one for each ear of the hearing aid user (a so called binaural hearing aid system). Furthermore the hearing aid system may comprise an external device, such as a smart phone having software applications adapted to interact with other devices of the hearing aid system. Thus within the present context the term "hearing aid system device" may denote a hearing aid or an external device.

Generally a hearing aid system according to the invention is understood as meaning any system which provides an output signal that can be perceived as an acoustic signal by a user or contributes to providing such an output signal and which has means which are used to compensate for an individual hearing loss of the user or contribute to compensating for the hearing loss of the user. These systems may comprise hearing aids which can be worn on the body or on the head, in particular on or in the ear, and can be fully or partially implanted. However, some devices whose main aim is not to compensate for a hearing loss may nevertheless be considered a hearing aid system, for example consumer electronic devices (televisions, hi-fi systems, mobile phones, MP3 players etc.) provided they have measures for compensating for an individual hearing loss.

It is well known within the art of hearing aid systems that most users will benefit from a hearing aid programming (this process may also be denoted fitting) that takes the user's personal preferences into account. This type of fine tuning or optimization of the hearing aid system settings may be denoted personalization or using a more generic term it may be denoted a machine learning procedure. However, it is well known that the process of personalization is a very challenging one.

One problem with personalization is that it may be very difficult for a user to explain in words what types of signal processing and the resulting sounds that are preferred.

Personalization may generally be advantageous with respect to basically all the various types of signal processing that are carried out in a hearing aid system. Thus personalization may be relevant for e.g. noise reduction as well as for classification of the sound environment.

EP-B1-1946609 discloses a method for optimization of hearing aid parameters. The method is based on Bayesian incremental preference elicitation whereby at least one signal processing parameter is adjusted in response to a user adjustment. According to a specific embodiment the user adjustment is simply an indication of user dissent.

EP-B1-1946609 is complicated in so far that it applies a parameterized approach in order to model the user's unknown internal response function (i.e. the user's preference), because it is very difficult to find a suitable parameterized model that suits the great variety of hearing aid system users unknown internal response functions.

Furthermore EP-B1-1946609 is complicated because the processing and memory requirements are very high, especially for hearing aid systems that generally have limited processing and memory resources.

One advanced method for optimizing hearing aid parameters includes interaction between a hearing aid system and an internet server. The advantage of such systems are the abundant processing resources available in the internet server and the suitability of such systems to receive data from a multitude of hearing aid systems and provide some form of processed data back to the multitude of hearing aid systems. In the following such systems may be denoted an in situ fitting system, thus this terminology simply represents a system comprising a hearing aid system and at least one internet server, which are adapted to optimize the setting of at least some of the hearing aid parameters.

It is therefore a feature of the present invention to provide an improved method of operating an in situ fitting system with respect to at least ease of use, time spent by the user and the general user satisfaction.

It is another feature of the present invention to provide an in situ fitting system with such improved means for optimizing a hearing aid system setting.

Additionally, the inventor has found that internally generated sounds that are used for providing comfort, be it for masking undesired sounds or for causing a relaxing experience, may benefit significantly from personalization.

In the context of the present disclosure, a relaxing sound should be understood as a sound having a quality whereby it is easy to relax and be relieved of e.g. stress and anxiety when subjected to it. Traditional music is one example of relaxing sound while noise is most often used to refer to a sound that is not relaxing.

In the context of the present disclosure, a relaxing sound may especially be understood as a sound adapted for relieving tinnitus.

However, in the present context, internally generated sounds may also be used for other purposes than providing comfort.

SUMMARY OF THE INVENTION

The invention, in a first aspect, provides a method of operating an in situ fitting system according to claim 1.

This provides an improved method of operating an in situ fitting system in order to adapt the hearing aid system to a user's preference.

The invention, in a second aspect, provides an in situ fitting system according to claim 10.

This provides an improved in situ fitting system with respect to user personalization and hearing aid parameter optimization.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other embodiments, and its several details are capable of modification in various, obvious aspects all without departing from the invention. Accordingly, the drawings and descriptions will be regarded as illustrative in nature and not as restrictive. In the drawings.

DETAILED DESCRIPTION

According to an aspect of the invention it has been found that it provides a significant improvement for the user if the hearing aid system settings can be adapted to the user's current preferences (i.e. personalized). This is even more so because the user's preferences may vary significantly up to several times during a day, as a function of e.g. the time of day (morning, afternoon or evening) or the user's mood or the type of activity the user is engaged in.

As a consequence of these varying preferences of many users it provides a significant improvement for the user if the personalization can be carried out without having to spend too much time optimizing the settings.

Furthermore, it has been found that it is of significant importance that the personalization (i.e. the optimization of a hearing aid parameter setting) can be carried out without requiring the user to interact with the hearing aid system in a complex manner.

Figure 1:
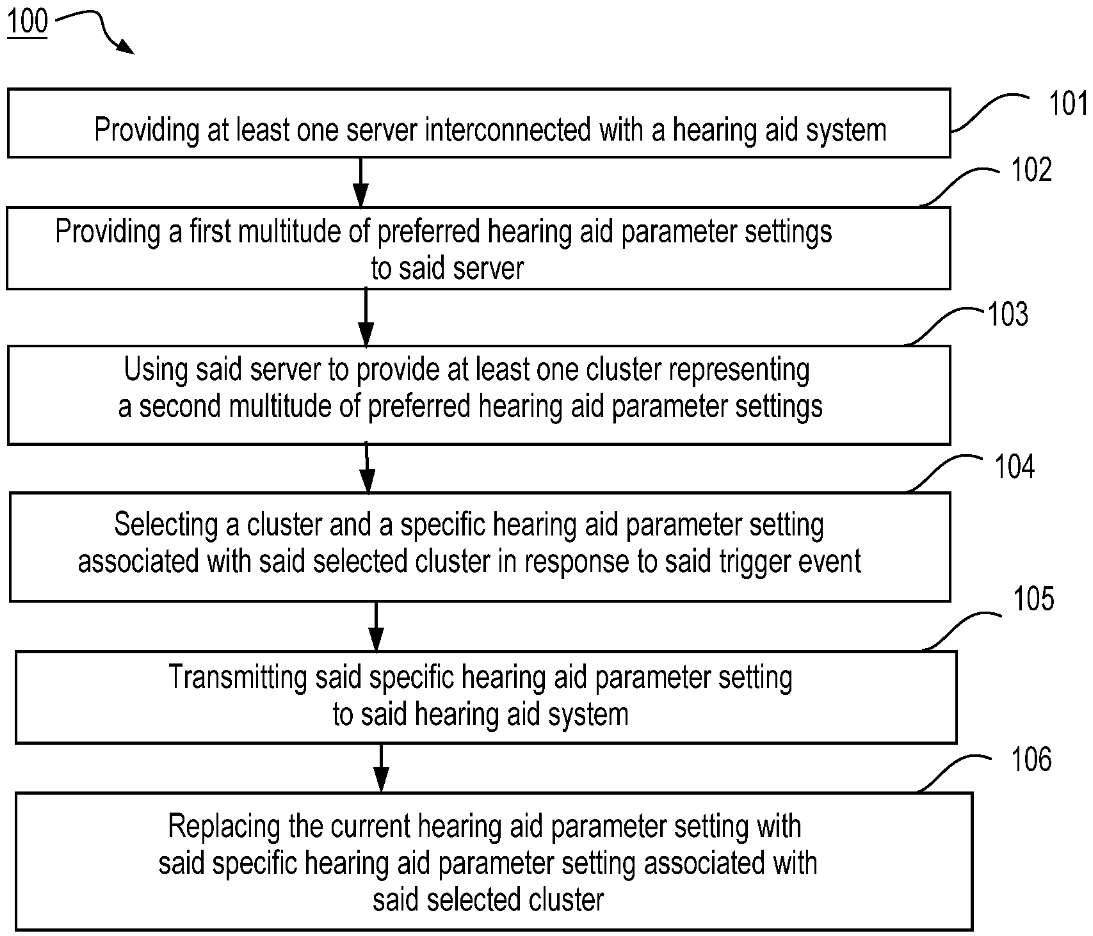
FIG. 1 illustrates highly schematically a method of operating an in situ fitting system according to an embodiment of the invention.

Reference is first made to FIG. 1 which illustrates highly schematically a method 100 of operating an in situ fitting system according to a first embodiment of the invention, with the purpose of adapting the in situ fitting system for adjusting a hearing aid parameter setting of a hearing aid system in response to a trigger event indicating that a first hearing aid system setting is not satisfactory.

According to a first step 101 at least one server interconnected with said hearing aid system is provided.

In variations a hearing aid or an external device of the hearing aid system is connected directly to the server using a wireless link to the internet, based on e.g. the 3G, 4G or upcoming 5G broadband cellular network technology. Alternatively, an external device such as a smart phone of the hearing aid system may be used as gateway for the hearing aid, all of which will be well known for the skilled person.

In the following the terms "server" and "internet server" may be used interchangeably.

According to a second step 102 a first multitude of preferred hearing aid parameter settings is provided to said at least one server. Thus in the present context a hearing aid parameter setting represents a set of selected values one for each of a corresponding set of parameters. According to a variation the provided hearing aid parameter settings only represents a sub-set of all the parameters required to operate the hearing aid system.

According to a specific advantageous variation of the present invention, the parameters, whose selected (i.e. preferred) values are provided to said at least one server, have been carefully selected due to their ability to represent general trends for all hearing aid system users. One example of such a set of parameters represent additional gains to be added or subtracted in a set of frequency bands (i.e. these gains may also be denoted fine adjustment gains). In more specific variations the number of frequency bands is three or four. However, more frequency bands such as between 10 and 20 may also be considered based on both the available processing power and the number of preferred settings.

Basically any type of hearing aid parameter is suitable for being adjusted in accordance with this method, thus e.g. noise reduction algorithms, beam forming algorithms, and compressor settings may be improved.

In variations the multitude of preferred hearing aid parameter settings may be obtained using the optimization method disclosed in WO-A1-2016004983 with the title "Method of optimizing parameters in a hearing aid system and a hearing aid system" and by the same applicant and which is hereby incorporated by reference. More specifically reference is given to page 20, lines 15-27, which describes criteria for considering a hearing aid parameter setting to be preferred.

According to a third step 103 said at least one server is used to provide at least one cluster representing a second multitude of preferred hearing aid parameter settings.

According to a fourth step 104 a cluster and a specific hearing aid parameter setting associated with said selected cluster among said at least one clusters is selected in response to said trigger event being provided to said server.

According to variations the specific hearing aid parameter setting is determined from a group comprising a mean, a centroid and a median of the selected cluster, as will be well known for the skilled person.

According to a fifth step 105 said specific hearing aid parameter setting is transmitted to said hearing aid system.

According to a sixth and final step 106 said first hearing aid parameter setting is replaced with said specific hearing aid parameter setting associated with said selected cluster.

In a specific variation the method 100 comprises the further steps of:

identifying a present sound environment in response to said trigger event, and wherein the method steps of: providing to said at least one server a first multitude of preferred hearing aid parameter settings, and using said at least one server to provide at least one cluster representing a second multitude of preferred hearing aid parameter settings only includes settings that has been associated with the identified sound environment.

Hereby an even better chance of providing a satisfactory hearing aid system setting in the current sound environment is provided.

In further specific variations the identification of the present sound environment is carried out by:

enabling a hearing aid user select the present sound environment using a Graphical User Interface (GUI) accommodated in the hearing aid system or by using a sound environment classifier accommodated in the hearing aid system to select the present sound environment, which is advantageous in that it provides a highly reproducible sound environment classification.

or by:

using a geographical locator accommodated in the hearing aid system to select the present sound environment, which is advantageous in that it also provides a sound environment identification that is highly reproducible and additionally a classification that generally is easily recognizable by the user.

or by:

using information concerning the relative positioning of predetermined relatives, friends or other persons important for the hearing aid system user, which is advantageous in providing the opportunity of taking speaker characteristics of a few assumed preferred speakers into account when making the adjustment of the hearing aid parameter setting. More specifically relative positioning of predetermined persons may be achieved by localization of internet enabled devices associated with said persons.

According to a more specific embodiment the step of enabling a hearing aid user to select the present sound environment using a Graphical User Interface accommodated in the hearing aid system, comprises selecting from a group of sound environments each defined by the activity of the hearing aid user, and wherein said group of activities comprises watching television, being in a quiet environment, being at a smaller or larger party, shopping, eating, social interaction, being physically active, being transported, being outdoors and watching a show or movie.

According to an even more specific embodiment at least three or at least five of the above mentioned activities are included in the group that the user can select from.

According to another more specific embodiment the hearing aid user himself may create and name his own sound environment. This may especially be advantageous in the present context if other users also create a personal sound environment with the same or a similar name. Furthermore, such a user defined sound environment may be included among the options available for selection by other users dependent on the number of users that have chosen to define a sound environment with the same or a similar name. In this manner the sound environments offered for the hearing aid user to choose from may change over time based on input from the other hearing aid users.

According to another embodiment the step of identifying a present sound environment in response to said trigger event comprises the further step of enabling a hearing aid user to select, from a group of goals, at least one specific goal to achieve in the present sound environment by using a Graphical User Interface accommodated in the hearing aid system, wherein said group of goals comprises: suppress noise, improve concentration, enhance sound experience, enhance music quality, improve conversation quality and improve relaxation.

According to an even more specific embodiment at least two or at least four of the above mentioned goals to achieve are included in the group of goals that the user can select from.

Similar to what has already been described above, the hearing aid user may create and name her own goal to achieve within a given sound environment.

In this manner the group of goals that the hearing aid user can choose from may change over time based on input from the other hearing aid users.

In another variation said first multitude of preferred hearing aid parameter settings have been evaluated and preferred by a multitude of hearing aid system users, which is advantageous in that the available amount of data is increased and hereby the quality of the suggested new hearing aid parameter settings are likewise expected to improve.

In another variation the step of providing to said at least one server a first multitude of preferred hearing aid parameter settings comprises the further steps of providing to said at least one server a data set of subjective perceptual evaluations of a third multitude of hearing aid parameter settings, and using said data set to train a probability distribution of internal response functions, and generating a first multitude of synthetic internal response functions, from said probability distribution of internal response functions, and using the first multitude of synthetic internal response functions to provide said first multitude of preferred hearing aid parameter settings by determining, for each of said first multitude of synthetic internal response functions the hearing aid parameter setting that maximizes the synthetic internal response function, and wherein said data set is provided by a multitude of different hearing aid system users.

By training the probability distribution of internal response functions using all subjective perceptual evaluations carried out by a multitude of different hearing aid system users an improved result may be obtained compared to the case where the data set of subjective perceptual evaluations only is provided by a single hearing aid system user.

In more specific variations said subjective perceptual evaluations may be carried out in a multitude of different ways, including at least one of rating a single hearing aid parameter setting, comparing two different hearing aid parameter settings and selecting one of the two, and comparing two different hearing aid parameter settings and rating them comparatively.

Especially the latter type of evaluation is advantageous since it provides most information for training the probability function of internal response functions.

In other more specific variations the step of using the data set to train a probability distribution of internal response functions, is carried out using a method selected from a group comprising at least one of a Gaussian Process, and a Generalized linear model.

The Gaussian Process is especially advantageous because it is processing efficient.

According to a more specific variation said step of using the data set to train a probability distribution of internal response functions may be carried out e.g. as disclosed in WO-A1-2016004983 with the title "Method of optimizing parameters in a hearing aid system and a hearing aid system" and by the same applicant and which is hereby incorporated by reference. More specifically reference may be given to the disclosure contained from page 14, line 1 and to page 15, line 2.

In still other more specific variations the step of using said at least one server to provide at least one cluster representing a second multitude of preferred hearing aid parameter settings, is carried out using a clustering algorithm selected from a group of clustering algorithms comprising density models, such as High Density-Based Spatial Clustering of Applications with Noise (HDBSCAN) and centroid models such as Gaussian Mixture Models.

In another variation the step of providing to said at least one server a first multitude of preferred hearing aid parameter settings includes only preferred hearing aid parameter settings based on hearing aid system users with at least one of: similar audiograms, similar age, same sex and similar cognitive ability. It is well known within the art of hearing aid systems to group similar audiograms (which in the following may also be denoted hearing losses) e.g. in groups like mild, severe and profound hearing loss or in groups like high frequency loss or low frequency loss or combinations of the two types of groups. It will likewise be well known for the skilled person how to evaluate and determine the cognitive ability of users.

According to variations the trigger event is selected from a group comprising:

- activating of a hearing aid system handle adapted to provide an indication that the current hearing aid parameter setting is not satisfactory,
- detection that the current hearing aid parameter setting is too far from a cluster representing a multitude of preferred hearing aid parameter settings, and
- detection that the cognitive stress experienced by the hearing aid system user is above a given threshold.

According to more specific variations the handle is a button accommodated in a hearing aid of the hearing aid system or a handle implemented in a GUI of an external device, typically a smart phone, of the hearing aid system.

Figure 2:
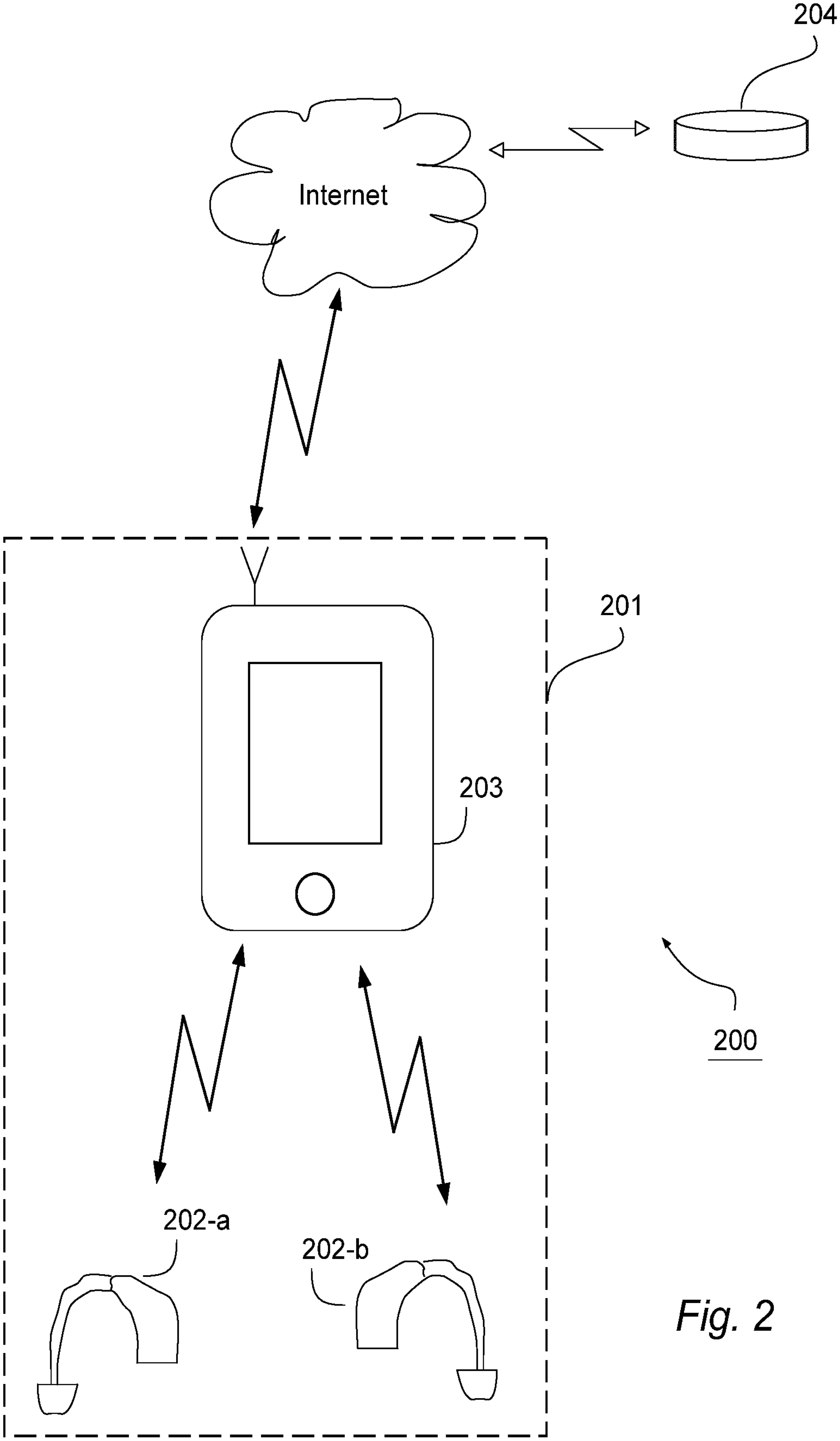
FIG. 2 illustrates highly schematically an in situ fitting system according to an embodiment of the invention.

Reference is now made to FIG. 2, which illustrates highly schematically an in situ fitting system 200 according to a second embodiment of the invention.

The in situ fitting system 200 comprises a hearing aid system 201 consisting of a left hearing aid 202-*a* and a right hearing aid 202-*b* and an external device, in the form of a smart phone 203 with a specific software application installed. Furthermore the in situ fitting system 200 comprises an internet server 204 that is adapted to receive, over the internet, a multitude of preferred hearing aid parameter settings, and adapted to transmit a specific hearing aid parameter setting to said hearing aid system 201 in response to a trigger event.

In obvious variations the hearing aid system may consist of a single hearing aid (a so called monaural fitting) or may consist of both a left and a right hearing aid (a so called binaural fitting) and furthermore the hearing aid system may (or may not) include an external device 203.

According to a further variation of the present invention an improved method of optimizing parameters in a hearing aid system may be obtained by carrying out the steps of

- providing a set of hearing aid parameters to be optimized;
- providing, from a multitude of different users, a multitude of subjective perceptual evaluations of a multitude of test sounds each based on a given hearing aid parameter setting;
- providing a data set of said multitude of subjective perceptual evaluations to at least one server;
- using said data set to train a first probability distribution of internal response functions;
- using said first probability distribution of internal response functions to provide a prior distribution over the function values of a specific user's internal response function;
- providing, from said specific user, a multitude of subjective perceptual evaluations of a multitude of test sounds defined by said set of hearing aid parameters to be optimized;
- using Bayes rule to obtain a posterior distribution over the function values of the specific user's internal response function;
- providing a predictive distribution based on the posterior distribution over the function values of the specific user's internal response function; and
- using the predictive distribution to find a hearing aid parameter value setting that the specific user prefers.

It is noted that the present invention does not require the use of probabilistic methods, although these are preferred because they are more efficient than parametric methods.

It is likewise noted that the present invention is independent on whether the parameters to be optimized are used to control how sound is processed in the hearing aid system or whether they are used to control how sound is synthetically generated by the hearing aid system.

The present invention is also independent on how the hearing aid system parameters are provided or offered or selected for optimization.

Generally, disclosed variations may be combined with all other disclosed variations.

The invention claimed is:

1. A method of operating an in situ fitting system adapted for adjusting a hearing aid parameter setting of a hearing aid system in response to a trigger event indicating that a first hearing aid system setting is not satisfactory, wherein the adjustment of the hearing aid parameter setting is carried out through the steps of:

- providing at least one server interconnected with said hearing aid system;
- providing to said at least one server a first multitude of hearing aid parameter settings;
- using said at least one server to provide at least one cluster representing a second multitude of hearing aid parameter settings;
- selecting a cluster and a specific hearing aid parameter setting associated with said selected cluster among said at least one clusters in response to said trigger event being provided to said server, and
- transmitting said specific hearing aid parameter setting to said hearing aid system, and
- replacing said first hearing aid parameter setting with said specific hearing aid parameter setting associated with said selected cluster;

wherein the step of providing to said at least one server the first multitude of hearing aid parameter settings comprises the further steps of:

- providing to said at least one server a data set of hearing aid perceptual evaluations of a third multitude of hearing aid parameter settings;
- using said data set to train a probability distribution of internal response functions;
- generating a first multitude of synthetic internal response functions, from said probability distribution of internal response functions, and
- using the first multitude of synthetic internal response functions to provide said first multitude of hearing aid parameter settings by determining, for each of said first multitude of synthetic internal response functions the hearing aid parameter setting that maximizes the synthetic internal response function, and wherein said data set is provided by a multitude of different hearing aid system users.

2. The method according to claim 1 comprising the further step of:

identifying a present sound environment in response to said trigger event;

and wherein the steps of:

providing to said at least one server the first multitude of hearing aid parameter settings, and using said at least one server to provide the at least one cluster representing a second multitude of hearing aid parameter settings;

only includes settings that has been associated with the identified sound environment.

3. The method according to claim 2 wherein the step of:

identifying the present sound environment in response to said trigger event comprises the further steps of at least one of:

enabling a hearing aid user to select the present sound environment using a Graphical User Interface accommodated in the hearing aid system;

using a sound environment classifier accommodated in the hearing aid system to select the present sound environment;

using a geographical locator accommodated in the hearing aid system to select the present sound environment; and using information concerning the relative positioning of predetermined relatives.

4. The method according to claim 3 wherein said step of enabling the hearing aid user to select the present sound environment using a Graphical User Interface accommodated in the hearing aid system, comprises selecting from a group of sound environments each defined by the activity of the hearing aid user, and wherein said group of activities comprises watching television, being in a quiet environment, being at a smaller or larger party, shopping, eating, social interaction, being physically active, being transported, being outdoors and watching a show or movie.

5. The method according to claim 3 wherein the step of identifying a present sound environment in response to said trigger event comprises the further step of enabling the hearing aid user to select, from a group of goals, at least one specific goal to achieve in the present sound environment by using a Graphical User Interface accommodated in the hearing aid system, wherein said group of goals comprises: suppress noise, improve concentration, enhance sound experience, enhance music quality, improve conversation quality and improve relaxation.

6. The method according to claim 1 wherein said first multitude of hearing aid parameter settings have been evaluated by a multitude of hearing aid system users.

7. The method according to claim 1, wherein said hearing aid perceptual evaluations used is selected from a group comprising at least one of:

rating a single hearing aid parameter setting, comparing two different hearing aid parameter settings and rating them comparatively, and comparing two different hearing aid parameter settings and selecting one of the two.

8. The method according to claim 1, wherein the step of:

using said data set to train the probability distribution of internal response functions, is carried out using at least one of a Gaussian Process and a Generalized linear model.

9. The method according to claim 1, wherein the step of:

using said at least one server to provide at least one cluster representing the second multitude of hearing aid parameter settings, is carried out using a clustering algorithm selected from a group of clustering algorithms comprising density models and centroid models.

10. The method according to claim 1, wherein the step of providing to said at least one server the first multitude of hearing aid parameter settings only includes hearing aid parameter settings based on hearing aid system users with at least one of: similar audiograms, similar age, same sex and similar cognitive ability.

11. An in situ fitting system adapted for adjusting the hearing aid parameter setting of the hearing aid system in response to the trigger event indicating that the first hearing aid system setting is not satisfactory, wherein the adjustment of the hearing aid parameter setting is carried out through the steps according to claim 1.

12. The hearing aid system forming part of the in-situ fitting system according to claim 11.

* * * * *